US009566828B2

(12) United States Patent
Araujo Da Silva et al.

(10) Patent No.: US 9,566,828 B2
(45) Date of Patent: Feb. 14, 2017

(54) COMPOSITION BASED ON NATURAL RUBBER AND A POLYIMINE COMPOUND

(75) Inventors: José Carlos Araujo Da Silva, Pont du Chateau (FR); Justin Belz, Riom (FR)

(73) Assignees: MICHELIN RECHERCHE ET TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 997 days.

(21) Appl. No.: 13/383,179

(22) PCT Filed: Jul. 8, 2010

(86) PCT No.: PCT/EP2010/059828
§ 371 (c)(1),
(2), (4) Date: Mar. 19, 2012

(87) PCT Pub. No.: WO2011/003982
PCT Pub. Date: Jan. 13, 2011

(65) Prior Publication Data
US 2012/0165449 A1    Jun. 28, 2012

(30) Foreign Application Priority Data
Jul. 10, 2009 (FR) ..................... 09/03436

(51) Int. Cl.
*B60C 1/00* (2006.01)
*C08K 5/29* (2006.01)
*C08L 21/00* (2006.01)

(52) U.S. Cl.
CPC ............. *B60C 1/0016* (2013.04); *C08K 5/29* (2013.01); *C08L 21/00* (2013.01)

(58) Field of Classification Search
CPC .......... B60C 1/0016; C08K 5/29; C08L 21/00
USPC ....................................... 524/237
See application file for complete search history.

(56) References Cited

U.S. PATENT DOCUMENTS

| | | | |
|---|---|---|---|
| 3,668,183 A | 6/1972 | Hoy et al. | |
| 4,020,453 A | 4/1977 | Spies et al. | |
| 6,774,255 B1 | 8/2004 | Tardivat et al. | |
| 6,849,754 B2 | 2/2005 | Deschler et al. | |
| 2004/0051210 A1 | 3/2004 | Tardivat et al. | |
| 2004/0132880 A1 | 7/2004 | Durel et al. | |
| 2005/0016650 A1 | 1/2005 | Durel et al. | |
| 2005/0016651 A1 | 1/2005 | Durel et al. | |
| 2008/0154020 A1 | 6/2008 | Yan et al. | |
| 2011/0178233 A1 | 7/2011 | Chabotche et al. | |

FOREIGN PATENT DOCUMENTS

| | | | |
|---|---|---|---|
| FR | 760.442 | | 2/1934 |
| FR | 2 291 064 | | 6/1976 |
| FR | 2 291 065 | | 6/1976 |
| JP | 2-117939 A | | 5/1990 |
| JP | 2006-063206 A | | 3/2006 |
| JP | 2009057475 A | * | 3/2009 |
| WO | 96/37547 A2 | | 11/1996 |
| WO | WO 99/09036 A1 | | 2/1999 |
| WO | WO 00/05300 A1 | | 2/2000 |
| WO | WO 01/55252 A1 | | 8/2001 |
| WO | WO 01/96442 A1 | | 12/2001 |
| WO | WO 02/10269 A2 | | 2/2002 |
| WO | WO 02/30939 A1 | | 4/2002 |
| WO | WO 02/31041 A1 | | 4/2002 |
| WO | WO 02/083782 A1 | | 10/2002 |
| WO | WO 03/002648 A1 | | 1/2003 |
| WO | WO 03/002649 A1 | | 1/2003 |
| WO | WO 03/002653 A1 | | 1/2003 |
| WO | WO 03/016387 A1 | | 2/2003 |
| WO | WO 2005/087859 A1 | | 9/2005 |
| WO | WO 2006/002993 A1 | | 1/2006 |
| WO | WO 2006/023815 A1 | | 3/2006 |
| WO | WO 2006/061064 A1 | | 6/2006 |
| WO | WO 2006/069792 A1 | | 7/2006 |
| WO | WO 2006/125532 A1 | | 11/2006 |
| WO | WO 2006/125533 A1 | | 11/2006 |
| WO | WO 2006/125534 | | 11/2006 |
| WO | WO 2007/003408 A1 | | 1/2007 |
| WO | WO 2007/017060 A1 | | 2/2007 |
| WO | WO 02/053634 A1 | | 7/2007 |
| WO | WO 2007/098080 A2 | | 8/2007 |
| WO | WO 2008/003434 A1 | | 1/2008 |
| WO | WO 2008/003435 A1 | | 1/2008 |
| WO | 2008/141702 | | 11/2008 |

OTHER PUBLICATIONS

Derwent Abstract of JP 02-117939, May 2, 1990.*
English Translation of JP 02-117939, May 2, 1990.*
International Search Report (PCT/ISA/210) issued on Aug. 20, 2010, by European Patent Office as the International Searching Authority for International Application No. PCT/EP2010/059828.
Advanced Organic Chemistry, Part B: Reactions and Synthesis by F. A. Carey and R. J. Sundberg, 4th Edition, p. 31-33.
Advanced Organic Chemistry, Reactions, Mechanisms, and Structure by J. March, 5th Edition, p. 1185-1187.

* cited by examiner

*Primary Examiner* — Angela C Scott
(74) *Attorney, Agent, or Firm* — Dickinson Wright PLLC

(57) ABSTRACT

Reinforced rubber composition based on, exhibiting a lesser hysteresis degradation over time, based on at least (a) an elastomeric matrix predominantly based on natural rubber, (b) a reinforcing filler and (c) a specific polyimine compound in a content of between 6 and 20 mmol per 100 g of elastomer. This rubber composition is intended, for example, for the manufacture of a semi-finished rubber product intended for the tyres of motor vehicles.

16 Claims, No Drawings

COMPOSITION BASED ON NATURAL RUBBER AND A POLYIMINE COMPOUND

The present invention relates to reinforced rubber compositions based on natural rubber comprising at least one polyimine compound having improved hysteresis properties in the vulcanized state. These rubber compositions are intended, for example, for the manufacture of a semi-finished rubber product intended for the tyres of land and air vehicles.

Since savings in fuel and the need to protect the environment have become a priority, it has proved necessary to produce tyres having a rolling resistance that is as low as possible, without having a disadvantageous effect on their wear resistance. This has been made possible in particular by virtue of the use, in the rubber compositions, of specific inorganic fillers capable of competing, from a reinforcing viewpoint, with an organic filler such as conventional tyre-grade carbon black, while giving these compositions a lower hysteresis, synonymous with a lower rolling resistance for the tyres comprising them.

To further reduce the rolling resistance remains, in the current economic and ecological context, a permanent concern despite the low levels achieved respectively both with the specific inorganic fillers described as "reinforcing" and with a carbon black. Numerous avenues have already been explored in order to further lower the hysteresis of the rubber compositions reinforced with such reinforcing fillers. Mention may be made, by way of example, of the modification of the structure of the synthetic diene polymers at the end of polymerization by means of functionalization, coupling or star-branching agents, with the aim of obtaining good interaction between the polymer thus modified and the reinforcing filler. Mention may also be made of patent application WO 96/37547 A1 describing a rubber composition that uses, as reinforcing filler, carbon black with silica attached to its surface and that is based on a functionalized or unfunctionalized diene polymer and on a silane coupling or covering agent in a relatively high amount.

It is desirable for the low hysteresis of the compositions having a reduced rolling resistance and a good wear resistance to remain as low as possible during the life of the tyres comprising them, that is to say for the evolution thereof, especially due to thermal oxidation or to self-heating of the rubber composition, relative to the initial hysteresis value, to be minimal and as slow as possible.

Patent application JP 2006/063206 A1 discloses the addition of polyamines in order to improve the abrasion resistance of compositions based on natural or synthetic rubbers containing an inorganic filler as the sole or predominant reinforcing filler or as a blend with carbon black present in a minority amount and a silane coupling agent without significantly deteriorating the elongation and viscoelastic properties of the composition.

The inventors have discovered during their research that in a rubber composition based on natural rubber as the main elastomer and reinforced either with an organic filler such as carbon black or with a reinforcing inorganic filler such as silica or else a blend of organic and inorganic fillers, the addition of certain polyimine compounds gives these vulcanized compositions improved rubber properties, in particular hysteresis properties, and especially confers a lesser hysteresis degradation over time. This significant and long-lasting improvement over time of the hysteresis in the proportions observed within the context of compositions according to the invention comprising a polyimine compound is, to say the least, unexpected compared to the change over time of the hysteresis exhibited by such a composition that is free of polyimine compound.

The hysteresis properties significantly improved over time of such compositions in accordance with the invention based on natural rubber and on a polyimine compound render the latter particularly suitable for the manufacture of semi-finished rubber products intended for tyres, especially for land motor vehicles, such as under layers, rubbers for coating metallic or textile reinforcements, sidewall rubbers or treads.

Thus, one subject of the present invention is a reinforced rubber composition based at least on an elastomeric matrix comprising natural rubber (NR), an organic or inorganic reinforcing filler or a blend of the two, a coupling agent in the event an inorganic filler is used and a polyimine compound corresponding to formula 1 or 2 below:

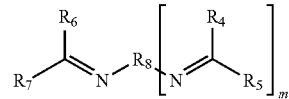

Formula 1

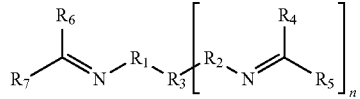

Formula 2 in which:
$R_4$, $R_5$, $R_6$ and $R_7$, which are identical or different, are selected from alkyl groups having from 1 to 20 carbon atoms, cycloalkyl groups having from 5 to 24 carbon atoms, aryl groups having from 6 to 18 carbon atoms or aralkyl groups having from 7 to 25 carbon atoms;

$R_1$ and $R_2$, which are identical or different, are selected from the group consisting of alkylidenes having from 1 to 20 carbon atoms, cycloalkylidenes having from 5 to 24 carbon atoms, arylidenes having from 6 to 18 carbon atoms, aralkylidenes having from 7 to 25 carbon atoms and heterocycles, which are identical or different, having from 4 to 25 carbon atoms;

$R_3$ and $R_8$, which are identical or different, are selected from the group consisting of alkylidenes having from 1 to 20 carbon atoms, alkylidynes having from 1 to 20 carbon atoms, alkylylidynes having from 1 to 20 carbon atoms, cycloalkylidenes having from 5 to 24 carbon atoms, cycloalkylidynes having from 5 to 24 carbon atoms, cycloalkylylidynes having from 5 to 24 carbon atoms, arylidenes having from 6 to 18 carbon atoms, arylidynes having from 6 to 18 carbon atoms, arylylidynes having from 6 to 18 carbon atoms, aralkylidenes having from 7 to 25 carbon atoms, aralkylidynes having from 6 to 18 carbon atoms, aralkylylidynes having from 6 to 18 carbon atoms, and heterocycles, which are identical or different, having from 4 to 25 carbon atoms;

$R_3$ optionally comprises one or more heteroatom(s), chosen from O, N, S and Si;

m is equal to 1, 2 or 3;
n is equal to 1, 2 or 3.

Another subject of the invention is a process for the preparation of such a reinforced rubber composition defined above.

A further subject of the invention is a tyre semi-finished rubber product constituted completely or partly of the reinforced rubber composition defined above.

Another subject of the invention is a tyre comprising at least one semi-finished rubber product constituted completely or partly of the reinforced rubber composition as defined above.

For greater clarity on reading that which will follow, the expression composition "based on" is understood to mean a composition comprising the mixture and/or the reaction product of the various constituents used, some of these base constituents being capable of reacting or intended to react with one another, at least in part, during the various phases of manufacture of the composition, in particular during the crosslinking or vulcanization thereof.

In the present description, unless expressly indicated otherwise, all the percentages (%) shown are % by weight. Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

Furthermore, the amounts of the components of the invention may be expressed in phr, that is to say in parts (by weight) per hundred parts by weight of elastomer.

Thus, a first subject of the invention is a reinforced rubber composition based at least (a) on an elastomeric matrix comprising at least non-halogenated natural rubber predominantly, (b) on a reinforcing filler, (c) on a polyimine compound corresponding to formula 1 or 2 below:

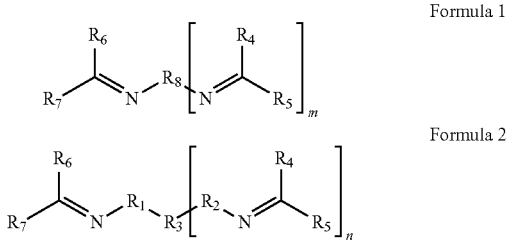

Formula 1

Formula 2 in which:
R$_4$, R$_5$, R$_6$ and R$_7$, which are identical or different, are selected from alkyl groups having from 1 to 20 carbon atoms, cycloalkyl groups having from 5 to 24 carbon atoms, aryl groups having from 6 to 18 carbon atoms or aralkyl groups having from 7 to 25 carbon atoms;
R$_1$ and R$_2$, which are identical or different, are selected from the group consisting of alkylidenes having from 1 to 20 carbon atoms, cycloalkylidenes having from 5 to 24 carbon atoms, arylidenes having from 6 to 18 carbon atoms, aralkylidenes having from 7 to 25 carbon atoms and heterocycles, which are identical or different, having from 4 to 25 carbon atoms;
R$_3$ and R$_8$, which are identical or different, are selected from the group consisting of alkylidenes having from 1 to 20 carbon atoms, alkylidynes having from 1 to 20 carbon atoms, alkylylidynes having from 1 to 20 carbon atoms, cycloalkylidenes having from 5 to 24 carbon atoms, cycloalkylidynes having from 5 to 24 carbon atoms, cycloalkylylidynes having from 5 to 24 carbon atoms, arylidenes having from 6 to 18 carbon atoms, arylidynes having from 6 to 18 carbon atoms, arylylidynes having from 6 to 18 carbon atoms, aralkylidenes having from 7 to 25 carbon atoms, aralkylidynes having from 6 to 18 carbon atoms, aralkylylidynes having from 6 to 18 carbon atoms, and heterocycles, which are identical or different, having from 4 to 25 carbon atoms;
R$_3$ optionally comprises one or more heteroatom(s), chosen from O, N, S and Si;
m is equal to 1, 2 or 3;
n is equal to 1, 2 or 3.

As polyimine compounds, use is preferably made of diimine, triimine and tetraimine compounds. These compounds and their preparation process are described in the prior art, either to improve the abrasion resistance of rubber compositions intended for manufacturing tyres, and mention may be made, in this regard, to the aforementioned patent application JP 2006/063206 A1, or for the preparation of resins according to the process described in patent U.S. Pat. No. 3,668,183.

The polyimine compounds may, for example, as is known per se, be synthesized by condensing an amine with a ketone. This method of preparing imines is described in "Advanced Organic Chemistry, Part B: Reactions and Synthesis" by F. A. Carey and R. J. Sundberg, 4th Edition, p. 31-33, and also in "Advanced Organic Chemistry, Reactions, Mechanisms, and Structure" by J. March, 5th Edition, p. 1185-1187 and in the references cited by these works.

The amines used for the synthesis of the products corresponding to formula 1 may be, for example:
1,2-propylenediamine, 3,3'-dimethyl-4,4'-diaminodicyclohexylmethane, 4,4'-diaminodicyclohexylmethane, isophore diamine, neopentanediamine(2,2-dimethylpropane-1,3-diamine), 1,8-octamethylenediamine, molten 4,4'-methylenedianiline, ethylenediamine, 1,3-diaminopropane, 1,6-hexamethylenediamine, 1,4-phenylenediamine, 1,3-phenylenediamine, 1,2-phenylenediamine, 1,2-diaminocyclohexane, 1,3-diaminocyclohexane, 1,4-diaminocyclohexane, 1,3-diamino-4-methylbenzene and preferably 1,8-octamethylenediamine, 1,6-hexamethylenediamine, 1,2-diaminocyclohexane and 1,4-diaminocyclohexane.

The amines used for the synthesis of the products corresponding to formula 2 may be, for example:
4,7,10-trioxatridecane-1,13-diamine, 4,9-dioxadodecane-1,12-diamine, diethylenetriamine, N-3-amine-(3-(2-aminoethylamino)propylamine), dipropylene triamine, N,N-bis(3-aminopropyl)methylamine, N-4-amine-(N,N'-bis(3-aminopropyl)ethylenediamine), 2,4-diamino-6-methyl-1,3,5-triazine, 2,4-diamino-6-phenyl-s-triazine, melamine, triethylenetetramine, tetraethylenepentamine, 2,2',2"-nitrilotriethylamine, 3,6-dioxaoctane-1,8-diamine, N,N,N-tris(2-aminoethyl)amine, bis(3-aminopropyl)tetramethyldisiloxane, 2-(2-aminoethoxy)ethanamine, 3-{2-[2-(3-aminopropoxy)ethoxy]ethoxy}propan-1-amine, 3-[4-(3-aminopropoxy)phenoxy]propan-1-amine, 3-({2-(3-aminopropoxy)-1-[(3-aminopropoxy)methyl]ethoxy}propan-1-amine, 2-({2-[(2-aminophenyl)thio]ethyl}thio)aniline, 2-[(3-{[(2-aminophenyl)thio]methyl}-2,4,6-trimethylbenzyl)thio]aniline, 2-({4-[(2-aminophenyl)thio]but-2-enyl}thio)aniline and preferably N,N-bis(2-aminoethyl)ethane-1,2-diamine.

The ketones used for the synthesis of the products claimed in formula 1 or 2 may be, for example:
pentan-3-one, 2,2,6,6-tetramethylcyclohexanone, 2,2,4,4-tetramethyl-3-pentanone, 4-methylpentan-2-one, 2,4-dimethylpentan-3-one, 2,6-dimethylheptan-4-one, cyclohexanone, acetone, 2,6-dimethylcyclohexanone, 2,2,4,4-tetramethylpentan-3-one, (1,1',3',1")ter(cyclohexan)-2'-one, dicyclohexylmethanone, dicyclopentylmethanone, cyclopentanone, bicyclo[3.3.1]nonan-9-one, dicyclopropylmethanone, 2,6-di-tert-butylcyclohexanone, 2,6-dimethylcyclohexanone, 2,4-dimethyl-3-pentanone and preferably 4-methylpentan-2-one, 2,4-dimethylpentan-3-one, 2,6-dimethylheptan-4-one, cyclohexanone and cyclopentanone.

According to the present invention, the polyimine compounds corresponding to formula 1 or 2 are preferably chosen from those for which $R_4$, $R_5$ $R_6$ and $R_7$ are each a hydrocarbon-based radical chosen from unsubstituted, linear or branched, alkyl radicals having 1 to 4 carbon atoms and advantageously $R_4$ and $R_6$ are each a methyl radical, $R_5$ and $R_7$ are each an isobutyl radical or the respective assemblies "$R_4$, $R_5$" or "$R_6$, $R_7$" represent a cycloalkyl radical having 5 or 6 carbon atoms, $R_1$, $R_2$ and $R_8$ are each an unsubstituted, linear or branched, alkylidene radical having 2 to 8 carbon atoms or a cycloalkylidene radical having 6 carbon atoms and $R_3$ is an unsubstituted alkylidene radical having from 2 to 8 carbon atoms or an alkylidene radical having from 2 to 6 carbon atoms comprising N as heteroatom.

More preferably, these polyimine compounds are chosen from N,N'-bis(4-methylpentan-2-ylidene)hexane-1,6-diamine, N,N'-bis(2,6-dimethylheptan-4-ylidene)hexane-1,6-diamine, N,N'-bis(2,4-dimethylpentan-3-ylidene)hexane-1,6-diamine, N,N'-bis(4-methylpentan-2-ylidene)octane-1,8-diamine, N,N'-bis(2,6-dimethylheptan-4-ylidene)octane-1,8-diamine, N,N'-bis(2,4-dimethylpentan-3-ylidene)octane-1,8-diamine, N,N'-dicyclopentylidenehexane-1,6-diamine, N,N'-dicyclopentylideneoctane-1,8-diamine, N,N'-dicyclohexylidene-hexane-1,6-diamine, N,N'-dicyclohexylideneoctane-1,8-diamine, N,N'-bis(4-methylpentan-2-ylidene)cyclohexane-1,4-diamine, N,N'-bis(4-methylpentan-2-ylidene)cyclohexane-1,2-diamine, N,N'-bis(2,6-dimethylheptan-4-ylidene)cyclohexane-1,4-diamine, N,N'-bis(2,6-dimethylheptan-4-ylidene)cyclohexane-1,2-diamine, N,N'-dicyclohexylidenecyclohexane-1,4-diamine, N,N'-dicyclohexylidenecyclohexane-1,2-diamine, N-(4-methylpentan-2-ylidene)-,N,N'-bis((4-methylpentan-2-ylideneamino)ethyl)ethane-1,2-diamine and N-(2,6-dimethylheptan-4-ylidene)-N',N'-bis(2-(2,6-dimethylheptan-4-ylideneamino)-ethyl)ethane-1,2-diamine.

The rubber composition of the tyre component according to the invention comprises the polyimine compound in an amount ranging from 6 to 20 mmol per 100 g of elastomer, preferably ranging from 6 to 16 mmol per 100 g of elastomer, that is to say, comprises a high content of polyimine compound. The expression "polyimine compound" according to the invention should be understood to mean a compound or a mixture of several compounds corresponding to formula 1 or 2.

According to the invention, the elastomeric matrix of the composition is based on natural rubber. In some cases, the elastomeric matrix can advantageously be entirely composed of natural rubber (100% of the elastomeric matrix is composed of natural rubber). This alternative form is preferably employed when it is a matter of using the rubber composition to manufacture sidewalls or treads for tyres of utility vehicles, such as heavy vehicles, or else certain applications, such as ice or snow, of passenger vehicles, or else to manufacture metal reinforcement/rubber composites, such as, for example, crown or carcass plies.

The elastomeric matrix can also comprise, in addition to natural rubber, at least one other diene elastomer.

This or these other diene elastomers are then present in the matrix in proportions of between 0 and 50% by weight (the limits of this range being excluded), preferably from 5% to 40%, more preferably still from 15% to 40%.

In the case of a blend with at least one other diene elastomer, the weight fraction of natural rubber in the elastomeric matrix is predominant and preferably greater than or equal to 50% by weight of the total weight of the matrix, more preferably still from 60% to 85% by weight of the total weight of the matrix.

Predominant weight fraction according to the invention refers to the highest weight fraction of the blend. Thus, in a ternary NR/elastomer A/elastomer B blend, the weight fractions can be distributed in the proportions 45/30/25 or 40/40/20 or 40/30/30, the predominant weight fractions being respectively 45 or 40, and, in a binary NR/elastomer blend, the weight fractions can be distributed in the proportions 50/50 or 70/30, the predominant weight fractions being 50 or 70.

The term "diene elastomer" should be understood according to the invention as meaning any, optionally functionalized, natural rubber or any synthetic elastomer resulting at least in part from diene monomers. More particularly, the term "diene elastomer" is understood to mean any homopolymer obtained by polymerization of a conjugated diene monomer having from 4 to 12 carbon atoms or any copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units. The optionally functionalized natural rubber is preferably an epoxidised rubber.

The diene elastomer constituting a portion of the elastomeric matrix according to the invention is preferably chosen from the group of highly unsaturated diene elastomers consisting of polybutadienes (BRs), butadiene copolymers, polyisoprenes (PIs), isoprene copolymers and the mixtures of these elastomers. Such copolymers are more preferably chosen from the group consisting of copolymers of butadiene and of a vinylaromatic monomer, more particularly the butadiene/styrene copolymer (SBR), isoprene/butadiene copolymers (BIRs), copolymers of isoprene and of a vinylaromatic monomer, more particularly the isoprene/styrene copolymer (SIR), and isoprene/butadiene/styrene copolymers (SBIRs). Particular preference is given, among these copolymers, to copolymers of butadiene and of a vinylaromatic monomer, more particularly the butadiene/styrene copolymer (SBR).

The diene elastomer constituting a portion of the elastomeric matrix according to the invention may or may not be star-branched, coupled or functionalized, in a way known per se, by means of functionalization, coupling or star-branching agents known to a person skilled in the art. Mention may be made, for example, among others more conventional, of the elastomers coupled according to the processes described in the patent applications in the name of the Applicant Companies WO 08/141702, FR 2 2910 64, FR 2 291 065 and FR 07/60442.

The rubber composition according to the invention comprises at least three compounds, including a reinforcing filler in proportions ranging from 35 to 200 phr. Preferably, the content of total reinforcing filler is between 40 and 140 phr, more preferably between 50 and 130 phr, the optimum being, in a known way, different depending on the specific applications targeted for the tyre; the expected level of reinforcement with regard to a bicycle tyre, for example, is, of course, lower than that required with regard to a tyre capable of running at high speed in a sustained manner, for example a motorcycle tyre, a tyre for a passenger vehicle or a tyre for a utility vehicle, such as a heavy vehicle.

The reinforcing filler is composed of a reinforcing organic filler, such as carbon black, or of a reinforcing inorganic filler, such as reinforcing silica, in proportions ranging from 0 to 100% by weight of the total weight of the filler, or of an organic filler/inorganic filler blend depending on the application targeted. The proportion of organic or inorganic filler is respectively preferably greater than or equal to 50% by weight of the total weight of the filler, more particularly greater than 55% depending on the application targeted. The second reinforcing filler contained in the blend (mixture) with the predominant reinforcing filler is then preferably present in a weight fraction of less than 50% relative to the total weight of the filler.

The term "reinforcing inorganic filler" should be understood in the present patent application, by definition, as meaning any inorganic or mineral filler, whatever its colour or its origin (natural or synthetic), also known as "white filler", "clear filler", indeed even "non-black filler", in contrast to a conventional organic filler, such as carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The silica used can be any reinforcing silica known to a person skilled in the art, in particular any precipitated or pyrogenic silica exhibiting a BET surface area and a CTAB specific surface area both of less than 450 m$^2$/g, even if highly dispersible precipitated silicas are preferred. Mention will also be made, as reinforcing inorganic filler, of mineral fillers of the aluminous type, in particular alumina ($Al_2O_3$) or aluminium (oxide)hydroxides, or else reinforcing titanium oxides.

The physical state in which the reinforcing inorganic filler is provided is immaterial, whether in the powder, microbead, granule or bead form. Of course, the term "reinforcing inorganic filler" is also understood to mean mixtures of various reinforcing inorganic fillers, in particular of highly dispersible silicas as described above.

All carbon blacks, in particular blacks of the HAF, ISAF, SAF, FF, FEF, GPF and SRF types, conventionally used in tyre rubber compositions ("tyre-grade" blacks) are suitable as reinforcing organic filler. Mention will more particularly be made, among the latter, of the reinforcing carbon blacks of the 100, 200 or 300 series (ASTM grades), such as, for example, the N115, N134, N234, N326, N330, N339, N347 or N375 blacks, but also coarser blacks, such as, for example, the N550 or N683 blacks. The carbon blacks might, for example, be already incorporated in the natural rubber in the form of a masterbatch.

The black/silica blends or the blacks partially or fully covered with silica are suitable for forming the reinforcing filler. Carbon blacks modified by silica, such as, without implied limitation, the fillers which are sold by Cabot under the name "CRX 2000", and which are described in the international patent document WO-A-96/37547, are also suitable.

Mention may be made, as examples of reinforcing organic fillers other than carbon blacks, of functionalized polyvinylaromatic organic fillers, as described in patent applications WO-A-2006/069792 and WO-A-2006/069793, or else of functionalized nonaromatic polyvinyl organic fillers, as described in patent applications WO-A-2008/003434 and WO-A-2008/003435.

In the case where the reinforcing filler comprises only a predominant reinforcing inorganic filler and carbon black, the weight fraction of this carbon black in said reinforcing filler is more preferably chosen to be less than or equal to 30%, relative to the total weight of the reinforcing filler.

In the case where the reinforcing filler comprises a reinforcing inorganic filler, the rubber composition according to the invention comprises at least four compounds, including a coupling agent for coupling the reinforcing inorganic filler to the natural rubber and to the optional diene elastomers which make up the elastomeric matrix.

The term "coupling agent" is understood to mean more specifically an agent capable of establishing a satisfactory connection of chemical and/or physical nature between the filler in question and the elastomer, while facilitating the dispersion of this filler within the elastomeric matrix. Such an at least bifunctional bonding agent has, for example, the simplified general formula "Y-T-X'", in which:
  Y represents a functional group ("Y" function) which is capable of being bonded physically and/or chemically to the inorganic filler, it being possible for such a bond to be established, for example, between a silicon atom of the coupling agent and the surface hydroxyl (—OH) groups of the inorganic filler (for example the surface silanols, when silica is concerned);
  X' represents a functional group ("X'" function) capable of being bonded physically and/or chemically to the elastomer, for example via a sulphur atom;
  T represents a divalent group which makes it possible to connect Y and X'.

Agents referred to as covering agents for covering inorganic filler particles may also be used. They are capable of further improving, by bonding to the surface functional sites of the inorganic filler and by thus covering it at least partially, the dispersion of this inorganic filler in the elastomeric matrix, thus lowering its viscosity in the uncured state and on the whole improving its processability in the uncured state.

Such covering agents essentially belong to the family of polyols (for example diols, triols such as glycerol or its derivatives), polyethers (for example polyethylene glycols), primary, secondary or tertiary amines (for example trialkanolamines), hydroxylated or hydrolysable polyorganosiloxanes, for example α,ω-dihydroxypolyorganosilanes (in particular α,ω-dihydroxypolydimethylsiloxanes), hydroxysilanes, alkylalkoxysilanes, in particular alkyltriethoxysilanes, such as for example 1-octyltriethoxysilane sold by Degussa-Evonik under the name Dynasylan Octeo. These covering agents are well known in tyre rubber compositions reinforced with an inorganic filler; they have been described, for example, in patent applications WO 00/05300, WO 01/55252, WO 01/96442, WO 02/031041, WO 02/053634, WO 02/083782, WO 03/002648, WO 03/002653, WO 03/016387, WO 2006/002993, WO 2006/125533, WO 2007/017060 and WO 2007/003408.

The bonding agents must not be confused with simple agents for covering the filler in question which, in a known way, can comprise the Y function that is active with regard to the filler but are devoid of the X' function that is active with regard to the elastomer. Use may be made of any bonding agent known for or capable of efficiently providing, in the rubber compositions which can be used for the manufacture of tyres, the bonding (or the coupling) between a reinforcing inorganic filler, such as silica, and a diene elastomer, such as, for example, organosilanes, in particular alkoxysilane polysulphides or mercaptosilanes, or polyorganosiloxanes bearing the abovementioned X' and Y functions. Silica/elastomer bonding agents, in particular, have been described in a large number of documents, the most well known being bifunctional alkoxysilanes, such as alkoxysilane polysulphides. Use is made in particular of silane polysulphides, known as "symmetrical" or "unsymmetrical" according to their specific structure, as described, for example, in to patent applications WO 03/002648 (or US 2005/016651) and WO 03/002649 (or US 2005/016650).

Mention will more particularly be made, as examples of silane polysulphides, of bis(3-trimethoxysilylpropyl) or bis (3-triethoxysilylpropyl)polysulphides. Use is made in particular, among these compounds, of bis(3-triethoxysilylpropyl)tetrasulphide, abbreviated to TESPT, or of bis(3-triethoxysilylpropyl)disulphide, abbreviated to TESPD. Mention will also be made, as preferred examples, of bis(mono($C_1$-$C_4$)alkoxydi-($C_1$-$C_4$)alkylsilylpropyl)polysulphides (in particular disulphides, trisulphides or tetrasulphides), more particularly bis(monoethoxydimethylsilylpropyl) tetrasulphide, as described in patent application WO 02/083782 (or US 2004/132880).

Mention will in particular be made, as coupling agent other than alkoxysilane polysulphide, of bifunctional POSs (polyorganosiloxanes), or else of hydroxysilane polysulphides, as described in patent applications WO 02/30939 (or U.S. Pat. No. 6,774,255) and WO 02/31041 (or US 2004/051210), or else of silanes or POSs bearing azodicarbonyl functional groups, as described, for example, in patent applications WO 2006/125532, WO 2006/125533 and WO 2006/125534.

Mention will for example be made, as examples of other silane sulphides, of other silanes bearing at least one thiol (SH) function (referred to as mercaptosilanes) and/or at least one blocked thiol function, as described, for example, in patents or patent applications U.S. Pat. No. 6,849,754, WO 99/09036, WO 2006/023815 and WO 2007/098080.

Of course, mixtures of the coupling agents described above could also be used, as described, in particular, in patent application WO 2006/125534.

In the compositions in accordance with the invention, the content of coupling agent is advantageously less than 20 phr. The content thereof is preferably between 0.5 and 12 phr, more preferably from 3 to 10 phr, in particular from 4 to 7 phr. This content is easily adjusted by a person skilled in the art according to the content of inorganic filler used in the composition.

A person skilled in the art will understand that use might be made, as filler equivalent to the reinforcing inorganic filler described in the present section, of a reinforcing filler of another nature, in particular organic nature, provided that this reinforcing filler is covered with an inorganic layer, such as silica, for instance, without implied limitation, the fillers which are sold by Cabot under the name "CRX 2000", and which are described in the international patent document WO-A-96/37547, or else comprises, at its surface, functional sites, in particular hydroxyl sites, requiring the use of a coupling agent in order to establish the connection between the filler and the elastomer.

The rubber compositions in accordance with the invention can also comprise, in addition to coupling agents, coupling activators, agents for covering the inorganic fillers as described above, or more generally processing aids capable, in a known way, by virtue of an improvement in the dispersion of the filler in the rubber matrix and of a lowering in ,he viscosity of the compositions, of improving their ability to be processed in the uncured state.

The rubber compositions in accordance with the invention can also comprise all or some of the usual additives generally used in elastomer compositions intended for the manufacture of tyres, such as, for example, pigments, protection agents, such as antiozone waxes, chemical antiozonants, antioxidants, antifatigue agents, reinforcing or plasticizing resins, methylene acceptors (for example, phenol-novolac resin) or methylene donors (for example, HMT or H3M), as described, for example, in patent application WO 02/10269, a crosslinking system based either on sulphur or on sulphur donors and/or on peroxide and/or on bismaleimides, vulcanization accelerators, vulcanization activators, adhesion promoters, such as cobalt-based compounds, plasticizing agents, preferably nonaromatic or very slightly aromatic plasticizing agents chosen from the group consisting of naphthenic oils, paraffinic oils, MES oils or TDAE oils, ether plasticizers, ester plasticizers (for example, glycerol trioleates), and hydrocarbon-based resins having a high $T_g$, preferably of greater than 30° C., as described, for example, in patent applications WO 2005/087859, WO 2006/061064 and WO 2007/017060, and the mixtures of such compounds.

The invention also relates to a process for the preparation of a rubber composition as described above.

The composition is manufactured in appropriate mixers using two successive preparation phases well known to a person skilled in the art: (i) a first phase of thermomechanical working or kneading (phase referred to as "non-productive") at high temperature, up to a maximum temperature of between 130° C. and 200° C., preferably between 145° C. and 185° C., followed (ii) by a second phase of mechanical working (phase referred to as "productive") down to a lower temperature, typically of less than 110° C., for example between 40° C. and 100° C., also referred to as a finishing phase, during which the crosslinking system is incorporated. The expression "crosslinking system" is understood to mean either the crosslinking agents conventionally used with inorganic fillers or the vulcanization agents conventionally used such as sulphur or the vulcanization accelerators.

By way of example, the first (non-productive) phase is carried out in a single thermomechanical stage during which, in a first step at a temperature between 55° C. and 80° C., for example around 70° C., the diene elastomer(s) and the reinforcing filler are introduced into an appropriate mixer, such as an internal mixer, followed, in a second step, at a temperature between 80° C. and 110° C., for example around 90° C., by the introduction of the optional processing aids and the other additives, with the exception of the zinc oxide, the crosslinking or vulcanization system and the polyimine compound, followed, in a third step, at a temperature between 110° C. and 150° C., for example at 140° C., by the introduction of the zinc oxide. The total kneading time, in this non-productive phase, is preferably between 2 and 6 minutes with a maximum dropping temperature of around 165° C.

After cooling the mixture thus obtained, the vulcanization system and the polyimine compound in the aforementioned high content are incorporated at a temperature between 20° C. and 50° C., for example around 30° C., generally in an external mixer, such as an open mill; the combined mixture is then mixed (productive phase) for a few minutes, for example between 2 and 6 minutes.

The process in accordance with the invention for preparing a rubber composition according to the invention comprises at least the following stages:

carrying out, at a maximum temperature of between 130° C. and 200° C., preferably between 145° C. and 185° C., for a time preferably of between 2 and 6 minutes, a first step of thermomechanical working (sometimes described as "non-productive" phase) of the necessary base constituents of the rubber composition, with the exception of the crosslinking system and the polyimine compound, by intimately incorporating, by kneading in one or more stages, the constituents of the composition in the elastomeric matrix based on natural rubber, then carrying out, at a temperature lower than said maximum temperature of said first step, preferably of less than 110° C., for a time preferably of between 2 and 6 minutes, a second step of mechanical working (sometimes described as "productive" phase) advantageously on an open mill, during which said crosslinking system and the polyimine compound in the aforementioned high content are incorporated.

It should be noted that, according to the process in accordance with the invention, the polyimine compound incorporated into the composition must be incorporated at a high content, i.e. at a content ranging from 6 to 20 mmol per 100 g of elastomer, and preferably a content ranging from 6 to 16 mmol.

The final composition thus obtained can then be calendered, for example in the form of a sheet or slab, or else extruded, for example to form a rubber profiled element that can be used as a semi-finished rubber product intended for a tyre.

Another subject of the invention is a tyre which incorporates, in at least one of its constituent components, a reinforced rubber composition according to the invention.

One subject of the invention is very particularly a semi-finished rubber product, comprising a reinforced rubber composition according to the invention, intended for these tyres.

Due to the reduced hysteresis which characterizes a reinforced rubber composition according to the invention and due to its lesser degradation over time, compared to that of a composition free of polyimine compound, it should be noted that a tyre having a tread comprising the composition according to the invention exhibits an advantageously reduced rolling resistance during the life of said tyre.

Due to the reduced hysteresis which characterizes a rubber composition according to the invention and due to its lesser degradation over time, compared to that of a composition free of polyimine compound, it should also be noted that a tyre, the sidewalls or all or some of the inner compositions of which comprise the composition of the invention, exhibits significantly reduced self-heating and thermal oxidation and thus an improved endurance. The term "inner compositions" is understood to mean the compositions intended for manufacturing crown reinforcement plies, carcass reinforcement plies, beads, protectors, under layers, rubber blocks and other inner liners, especially decoupling rubbers, intended to provide the bonding or interface between the aforementioned regions of the tyres.

The tyres in accordance with the invention are in particular intended for passenger vehicles, for industrial vehicles chosen from vans, heavy vehicles, i.e. underground trains, buses, heavy road transport vehicles (lorries, tractors, trailers) or off-road vehicles, heavy agricultural vehicles or earth-moving equipment, planes, and other transportation or handling vehicles.

The abovementioned features of the present invention, and others, will be better understood on reading the following description of several exemplary embodiments of the invention, given by way of illustration and without implied limitation.

I. Measurements and Tests Used

The rubber compositions are characterized before and after curing, as indicated below:

1—Rheometry

The measurements are carried out at 150° C. with an oscillating disc rheometer, according to Standard DIN 53529—part 3 (June 1983). The change in the rheometric torque as a function of time describes the change in the stiffening of the composition as a result of the vulcanization reaction. The measurements are processed according to Standard DIN 53539—part 2 (March 1983): $t_i$ is the induction period, that is to say the time necessary for the start of the vulcanization reaction; $t_\alpha$ (for example $t_{99}$) is the time necessary to achieve a conversion of $\alpha$ % (for example 99%) of the difference between the minimum and maximum torques.

2—Tensile Tests

These tensile tests make it possible to determine the elasticity stresses and the properties at break. Unless otherwise indicated, they are carried out in accordance with French Standard NF T 46-002 of September 1988. The nominal secant moduli (or apparent stresses, in MPa) are measured in second elongation (i.e., after an accommodation cycle) at 10% elongation (denoted by E10), at 100% elongation (denoted by E100) and at 300% elongation (denoted by E300). All these tensile measurements are carried out under standard temperature (23±2° C.) and moisture (50±5% relative humidity) conditions, according to the French Standard NF T 40-101 (December 1979). The tensile strengths (in MPa) and the elongations at break (in %) at 23° C. are also measured.

3—The hysteresis losses (P60) are measured by rebound at 60° C. in %. The strain for the losses measured is 35%. The change in the hysteresis is assessed by measuring the hysteresis loss in the initial state after crosslinking the composition, then respectively after 7, 14 and 21 days of ageing of said composition. The values recorded in the tables are relative units (r.u.) established on a base 100 attributed to the value measured in the initial state of the control mixture. Any increase in value indicates a change that is detrimental to the hysteresis.

II. Exemplary Embodiment of the Invention

The objective of the exemplary embodiments is to compare the properties of a composition in accordance with the invention that comprises a polyimine compound at a high content and which is prepared according to the process in accordance with the invention with another composition that is identical except that it does not comprise a polyimine compound. The procedure for producing the compositions is the same for all the compositions tested.

Examples 1 to 3 show the improved properties (hysteresis) of a composition in accordance with the invention, when the reinforcing filler is 100% an organic filler such as carbon black.

EXAMPLE 1

The compositions tested have the following formulation (expressed in phr: parts per hundred parts of elastomer):

TABLE 1

| Composition No. | C-1 | C-2 |
|---|---|---|
| Diene elastomer (1) | 100 | 100 |
| Filler (2) | 50 | 50 |
| Antioxidant (3) | 2 | 2 |
| Polyimine (4) | 0 | 4.2 |
| ZnO (5) | 4 | 4 |
| Stearic acid (6) | 2.5 | 2.5 |

TABLE 1-continued

| Composition No. | C-1 | C-2 |
|---|---|---|
| Accelerator (7) | 1 | 1 |
| Sulphur | 4 | 4 |

(1) = Natural rubber
(2) = Carbon black N330
(3) = N-(1,3-Dimethylbutyl)-N'-phenyl-p-phenylenediamine ("Santoflex 6-PPD" from Flexsys)
(4) = N,N'-Bis(4-methylpentan-2-ylidene)hexane-1,6-diamine of formula

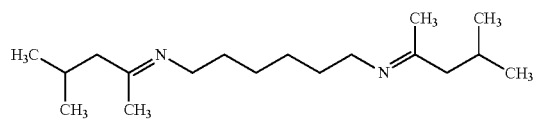 [SMILES: C/C(CC(C)C)=N\CCCCCC/N=C(\C)CC(C)C]

(5) = industrial grade from Umicore
(6) = "Pristerene 4931" from Uniquema
(7) = N-cyclohexyl-2-benzothiazylsulphenamide ("Santocure DBCS" from Flexsys)

The compound (4) N,N'-bis(4-methylpentan-2-ylidene)hexane-1,6-diamine is prepared according to the following process: introduced into a round-bottomed flask equipped with a Dean-Stark reflux condenser and a stirring system are 29 g (0.25 mol) of hexamethylenediamine and 250 g (2.5 mol) of 4-methylpentan-2-one. The reaction medium is brought to reflux until 0.5 mol of water (9 mL) is recovered via distillation. Next, the reaction medium is cooled down to room temperature and the excess ketone is distilled at 80° C. under 40 mbar.

4.2 phr of N,N'-bis(4-methylpentan-2-ylidene)hexane-1,6-diamine corresponds to 15 mmol of diimine per 100 g of elastomer.

Each of the following compositions is produced, in a first step, by thermomechanical working and then, in a second finishing step, by mechanical working.

The elastomer and the carbon black, at 90° C., the stearic acid and the antioxidant are successively introduced into a laboratory internal mixer of "Banbury" type, the capacity of which is 400 cm$^3$, which is 75% filled and which has a starting temperature of approximately 70° C. The zinc oxide is introduced at 140° C.

The stage of thermomechanical working is carried out for 3 to 5 minutes, up to a maximum dropping temperature of approximately 165° C.

The first abovementioned step of thermomechanical working is thus carried out, it being specified that the mean speed of the blades during this first step is 90 rpm.

The mixture thus obtained is recovered and cooled and then, in an external mixer (homofinisher), the sulphur, the sulphenamide and the polyimine in composition C-2 are added at 30° C., the combined mixture being further mixed for a time of 3 to 4 minutes (second abovementioned step of mechanical working).

The compositions thus obtained are subsequently calendered, either in the form of slabs (with a thickness ranging from 2 to 3 mm) or fine sheets of rubber, for the measurement of their properties before and after curing.

The compositions thus obtained can also be extruded in the form of profiled elements which can be used directly, after cutting and/or assembling to the desired dimensions, for example as tyre semi-finished products.

Results Obtained:

TABLE 2

| Composition No.: | C-1 | C-2 |
|---|---|---|
| Properties before curing: | | |
| $t_{99} - t_i$ (min) | 14 | 7.3 |
| Properties after curing: | | |
| E10 (MPa) | 6.5 | 5.7 |
| E100 (MPa) | 3.6 | 2.2 |
| E300 (MPa) | 4.5 | 2.6 |
| Scott fracture index at 23° C. | | |
| tensile strength (MPa) | 27 | 29 |
| elongation at break (%) | 378 | 540 |
| Change in the hysteresis (P60) | | |
| Initial state (r.u.) | 100 | 104 |
| After 7 days ageing (r.u.) | 107 | 97 |
| After 14 days ageing (r.u.) | 114 | 102 |
| After 21 days ageing (r.u.) | 117 | 109 |

It is observed that, regarding the properties in the vulcanized state, composition C-2 in accordance with the invention and comprising, at a high content, N,N'-bis(4-methylpentan-2-ylidene)hexane-1,6-diamine, has a lesser degradation of the hysteresis over time than that of the control mixture that contains no polyimine without significantly degrading the other properties. A mixture treated with the diimine and aged for 21 days has a hysteresis level slightly higher than that of the control mixture C-1 aged for 7 days and very substantially lower than that of control mixture C-1 aged for 21 days, which is a significant improvement.

EXAMPLE 2

The compositions tested have the following formulation (expressed in phr: parts per hundred parts of elastomer):

TABLE 3

| Compositions No. | C-1 | C-2 |
|---|---|---|
| Diene elastomer (1) | 100 | 100 |
| Filler (2) | 50 | 50 |
| Antioxidant (3) | 2 | 2 |
| Polyimine (4) | 0 | 2.1 |
| ZnO (5) | 4 | 4 |
| Stearic acid (6) | 2.5 | 2.5 |
| Accelerator (7) | 1 | 1 |
| Sulphur | 4 | 4 |

(1) = Natural rubber
(2) = Carbon black N330
(3) = N-(1,3-dimethylbutyl)-N'-phenyl-p-phenylenediamine phenylenediamine ("Santoflex 6-PPD" from Flexsys)
(4) = N,N'-bis(4-methylpentan-2-ylidene)cyclohexane-1,4-diamine of formula

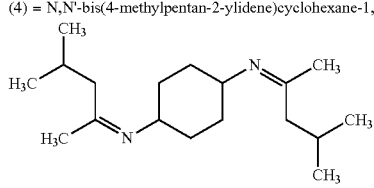

(5) = industrial grade from Umicore
(6) = "Pristerene 4931" from Uniquema
(7) = N-cyclohexyl-2-benzothiazylsulphenamide ("Santocure DBCS" from Flexsys)

The compound (4) N,N'-bis(4-methylpentan-2-ylidene)cyclohexane-1,4-diamine is prepared according to the following process: introduced into a round-bottomed flask equipped with a Dean-Stark reflux condenser and a stirring system are 27 g (0.25 mol) of 1,4-diaminocyclohexane and 250 g (2.5 mol) of 4-methylpentan-2-one. The reaction medium is brought to reflux until 0.5 mol of water (9 mL) is recovered via distillation. Next, the reaction medium is cooled down to room temperature and the excess ketone is distilled at 60° C. under 40 mbar.

2.1 phr of N,N'-bis(4-methylpentan-2-ylidene)cyclohexane-1,4-diamine corresponds to 7.5 mmol of diimine per 100 g of elastomer.

Results Obtained:

TABLE 4

| Composition No.: | C-1 | C-2 |
|---|---|---|
| Properties before curing: | | |
| $t_{99} - t_i$ (min) | 17 | 15 |
| Properties after curing: | | |
| E10 (MPa) | 6.7 | 6.3 |
| E100 (MPa) | 3.8 | 3.0 |
| E300 (MPa) | 4.7 | 3.6 |
| Scott fracture index at 23° C. | | |
| tensile strength (MPa) | 27 | 29 |
| elongation at break (%) | 345 | 449 |
| Change in the hysteresis (P60) | | |
| Initial state (r.u.) | 100 | 100 |
| After 7 days ageing (r.u.) | 112 | 103 |
| After 14 days ageing (r.u.) | 123 | 107 |
| After 21 days ageing (r.u.) | 133 | 120 |

It is observed that composition C-2 in accordance with the invention and comprising, at a high content, N,N'-bis(4-methylpentan-2-ylidene)cyclohexane-1,4-diamine, has a lesser degradation of the hysteresis over time than that of the control mixture C-1 that contains no polyimine without significantly degrading the other properties. A mixture treated with the diimine and aged for 21 days has a hysteresis level slightly lower than that of the control mixture C-1 aged for 14 days and very substantially lower than that of control mixture C-1 aged for 21 days, which is a significant improvement.

EXAMPLE 3

The compositions tested have the following formulation (expressed in phr: parts per hundred parts of elastomer):

TABLE 5

| Compositions No. | C-1 | C-2 |
|---|---|---|
| Diene elastomer (1) | 100 | 100 |
| Filler (2) | 50 | 50 |
| Antioxidant (3) | 2 | 2 |
| Polyimine (4) | 0 | 2.1 |
| ZnO (5) | 4 | 4 |
| Stearic acid (6) | 2.5 | 2.5 |
| Accelerator (7) | 1 | 1 |
| Sulphur | 4 | 4 |

(1) = Natural rubber
(2) = Carbon black N330
(3) = N-(1,3-dimethylbutyl)-N'-phenyl-p-phenylenediamine ("Santoflex 6-PPD" from Flexsys)
(4) = N,N'-bis(4-methylpentan-2-ylidene)cyclohexane-1,2-diamine of formula

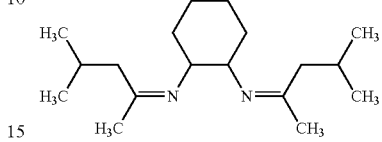

(5) = industrial grade from Umicore
(6) = "Pristerene 4931" from Uniquema
(7) = N-cyclohexyl-2-benzothiazylsulphenamide ("Santocure DBCS" from Flexsys)

The compound (4) N,N'-bis(4-methylpentan-2-ylidene) cyclohexane-1,2-diamine is prepared according to the following process: introduced into a round-bottomed flask equipped with a Dean-Stark reflux condenser and a stirring system are 27 g (0.25 mol) of 1,2-diaminocyclohexane and 250 g (2.5 mol) of 4-methylpentan-2-one. The reaction medium is brought to reflux until 0.5 mol of water (9 mL) is recovered via distillation. Next, the reaction medium is cooled down to room temperature and the excess ketone is distilled at 60° C. under 40 mbar.

2.1 phr of N,N'-bis(4-methylpentan-2-ylidene)cyclohexane-1,2-diamine corresponds to 7.5 mmol of diimine per 100 g of elastomer.

Results Obtained:

TABLE 6

| Composition No.: | C-1 | C-2 |
|---|---|---|
| Properties before curing: | | |
| $t_{99} - t_i$ (min) | 17 | 13 |
| Properties after curing: | | |
| E10 (MPa) | 6.7 | 7.0 |
| E100 (MPa) | 3.8 | 3.8 |
| E300 (MPa) | 4.7 | 4.4 |
| Scott fracture index at 23° C. | | |
| tensile strength (MPa) | 27 | 27 |
| elongation at break (%) | 345 | 371 |
| Change in the hysteresis (P60) | | |
| Initial state (r.u.) | 100 | 103 |
| After 7 days ageing (r.u.) | 112 | 108 |
| After 14 days ageing (r.u.) | 123 | 116 |
| After 21 days ageing (r.u.) | 133 | 123 |

It is observed that composition C-2 in accordance with the invention and comprising N,N'-bis(4-methylpentan-2-ylidene)cyclohexane-1,2-diamine has a lesser degradation of the hysteresis over time than that of the control mixture C-1 that contains no polyimine without significantly degrading the other properties. A mixture treated with the diimine and aged for 21 days has the same hysteresis level as the control mixture C-1 aged for 14 days. This hysteresis level is very substantially lower than that of control mixture C-1 aged for 21 days, which is a significant improvement.

The invention claimed is:

1. A rubber composition based at least:
   (a) on an elastomeric matrix comprising non-halogenated natural rubber, wherein the weight fraction of natural rubber in the elastomeric matrix is greater than or equal to 50% by weight of the total weight of the matrix,
(b) on a reinforcing filler, and
(c) on a polyimine compound, in a proportion ranging from 6 to 20 mmol per 100 g of elastomer, wherein the polyimine compound is selected from the group consisting of N,N'-bis(4-methylpentan-2-ylidene)hexane-1,6-diamine, N,N'-bis(2,6-dimethylheptan-4-ylidene)hexane-1,6-diamine, N,N'-bis(2,4-dimethylpentan-3-ylidene)hexane-1,6-diamine, N,N'-bis(4-methylpentan-2-ylidene)octane-1,8-diamine, N,N'-bis(2,6-dimethylheptan-4-ylidene)octane-1,8-diamine, N,N'-bis(2,4-dimethylpentan-3-ylidene)octane-1,8-diamine, N,N'-dicyclopentylidenehexane-1,6-diamine, N,N'-dicyclopentylideneoctane-1,8-diamine, N,N'-dicyclohexylidenehexane-1,6-diamine, N,N'-dicyclohexylideneoctane-1,8-diamine, N,N'-bis(4-methylpentan-2-ylidene)cyclohexane-1,4-diamine, N,N'-bis(4-methylpentan-2-ylidene)cyclohexane-1,2-diamine, N,N'-bis(2,6-dimethylheptan-4-ylidene)cyclohexane-1,4-diamine, N,N'-bis(2,6-dimethylheptan-4-ylidene)cyclohexane-1,2-diamine, N,N'-dicyclohexylidenecyclohexane-1,4-diamine, N,N'-dicyclohexylidenecyclohexane-1,2-diamine, N-(4-methylpentan-2-ylidene)-,N',N'-bis((4-methylpentan-2-ylideneamino)ethyl)ethane-1,2-diamine and N-(2,6-dimethylheptan-4-ylidene)-N',N'-bis(2-(2,6-dimethylheptan-4-ylideneamino) ethyl)ethane-1,2-diamine.

2. A rubber composition according to claim 1, wherein the elastomeric matrix consists of 100% natural rubber.

3. A rubber composition according to claim 1, wherein the reinforcing filler comprises an organic filler in a proportion of 100% by weight of the total weight of the filler.

4. A rubber composition according to claim 3, wherein the organic filler is carbon black.

5. A rubber composition according to claim 1, wherein the reinforcing filler comprises an inorganic filler and wherein it also comprises a coupling agent.

6. A rubber composition according to claim 5, wherein the inorganic filler is a reinforcing silica.

7. A rubber composition according to claim 1, wherein the reinforcing filler comprises a reinforcing inorganic filler in proportions ranging from 55% to 100% by weight of the total weight of the filler.

8. A rubber composition according to claim 1, wherein the polyimine compound is present in a proportion ranging from 6 to 16 mmol per 100 g of elastomer.

9. A rubber composition according to claim 1, wherein the polyimine compound is selected from the group consisting of N,N'-bis(4-methylpentan-2-ylidene)hexane-1,6-diamine; N,N'-bis(4-methylpentan-2-ylidene)cyclohexane-1,4-diamine; and N,N'-bis(4-methylpentan-2-ylidene)cyclohexane-1,2-diamine.

10. A rubber composition according to claim 1, wherein the rubber composition includes a crosslinking system.

11. A process for the preparation of a reinforced rubber composition as described in claim 1, comprising the following stages:
(i) carrying out, at a maximum temperature of between 130° C. and 200° C., a first step of thermomechanical working of at least the elastomeric matrix and the reinforcing filler of the rubber composition, with the exception of a crosslinking system, by incorporating, ingredients of the composition in the elastomeric matrix based on natural rubber, then
(ii) carrying out, at a temperature lower than said maximum temperature of said first step, a second step of mechanical working during which said crosslinking system is incorporated, wherein the addition of the polyimine compound is carried out during the above-mentioned stage (ii).

12. A preparation process according to claim 11, wherein the polyimine compound is added in a high content ranging from 6 to 20 mmol per 100 g of elastomer.

13. A preparation process according to claim 12, wherein the polyimine compound is added in a proportion ranging from 6 to 16 mmol per 100 g of elastomer.

14. A process for improving, over time, the hysteresis properties of a tire, comprising the incorporation, during the manufacture of this tire, of a reinforced rubber composition prepared in accordance with claim 11.

15. A tire semi-finished rubber product, comprising a crosslinkable or crosslinked rubber composition according to claim 1.

16. A tire comprising a semi-finished product according to claim 15.

* * * * *